Dec. 31, 1929.  W. D. CROWELL  1,741,502
VENTILATING MEANS FOR VEHICLE BODIES
Filed Nov. 24, 1928
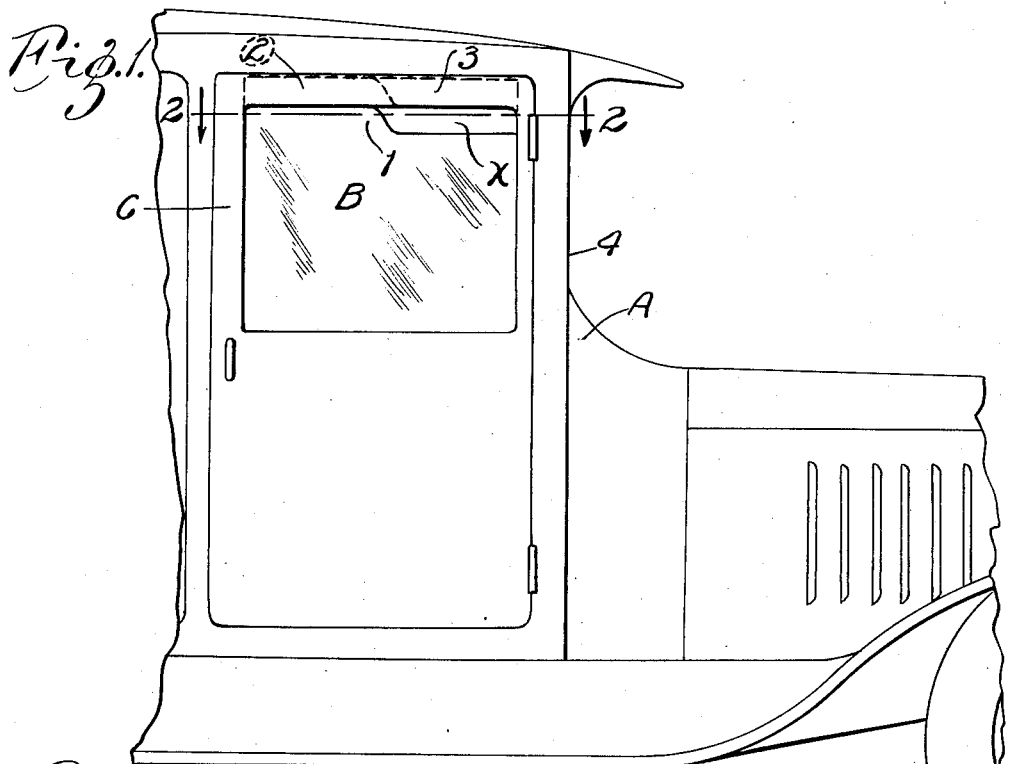
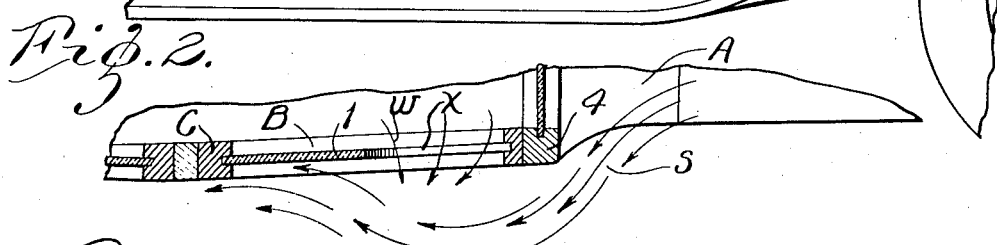
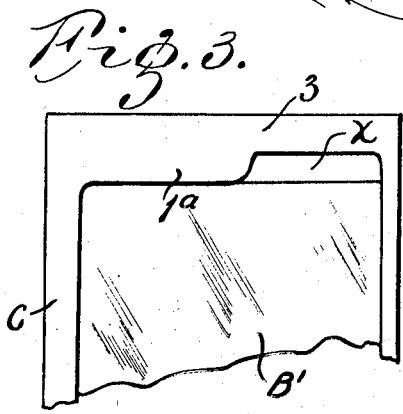
INVENTOR:
W. D. CROWELL
By Bakewell & Church
ATTORNEYS Patented Dec. 31, 1929

1,741,502

UNITED STATES PATENT OFFICE

WILLIAM D. CROWELL, OF ST. LOUIS, MISSOURI

VENTILATING MEANS FOR VEHICLE BODIES

Application filed November 24, 1928. Serial No. 321,642.

This invention relates to devices of the kind that are used for ventilating vehicle bodies.

The main object of the invention is to provide an efficient means for ventilating a vehicle body, that is of simple construction and of such design that it will not detract from the appearance of the vehicle body on which it is used.

I have herein illustrated my invention embodied in an automobile body of the closed type, but I wish it to be understood that the invention is applicable to any type or kind of a vehicle body provided in one of its side walls with an opening equipped with a closure that can be moved or adjusted so as to form a slot or space between one edge of said closure and an opposed portion of the frame that surrounds said opening.

Briefly stated, my invention consists of a vehicle body having a side wall provided with an opening, a closure for said opening that is capable of being moved or adjusted into an open condition, and a means that is adapted to co-act with said closure when said closure is in a partly open condition to form an exhaust slot or opening which is of such size and location that the air rushing rearwardly over the side wall of the body when the vehicle is in motion will create a suction or partial vacuum that causes air or gases to be withdrawn from the interior of the body through said exhaust opening. Usually, the closure for the opening in the side wall of the body will consist of a window arranged so that it can be adjusted or moved vertically to form a space between the top edge of the window and the top member of the window frame which extends transversely across the width of the window opening, and the means that co-acts with said window to produce said exhaust opening preferably consists of an upwardly-projecting extension on the top edge of the window, of less length than the width of the window, that is housed in a pocket in of the window, that is housed in a pocket in the top member of the window frame when the window is closed, said extension serving as a partial closure for the slot at the top edge of the window when the window is lowered slightly or in a partially open condition.

Figure 1 of the drawings is a side elevational view of a portion of an automobile body equipped with a ventilating means constructed in accordance with my invention.

Figure 2 is a horizontal sectional view, taken on the line 2—2 of Figure 1; and

Figure 3 is a side elevational view, illustrating another form of my invention.

In the drawings A designates a vehicle body of the closed type, for example, an automobile body, B designates a window that serves as a closure for an opening in one of the side walls of said body, and C designates a frame in which the window B is movably or adjustably mounted. The window frame C is herein illustrated as forming part of one of the side doors of the body, but it is immaterial whether said frame forms an integral portion of the side wall of the body, or is mounted in said side wall in such a way that it can be moved relatively to the same.

In the form of my invention shown in Figures 1 and 2 the window B is provided at its top edge with an upwardly-projecting extension 1 which preferably starts at a point adjacent the center of the window and terminates at the rear edge of the window. If the window B is formed from a sheet of relatively thick glass, as is the usual practice in the construction of automobile bodies, the extension 1 may be formed by an integral portion of said sheet of glass. When the window B is closed, or in its fully raised condition, the extension 1 is housed in a pocket 2 formed in the top member 3 of the window frame C. If it is desired to ventilate the body, it is only necessary to lower the window B sufficiently to produce an exhaust space or slot $x$ between the top edge of the window B and the top member 3 of the window frame located in front of the extension 1, without, however, completely withdrawing said extension from its pocket 2. The distance that the window B is moved downwardly to render the ventilating means operative will vary according to the height or depth of the extension 1, or according to the desire of the user. I have found that if the extension 1 is proportioned so that the top edge of said extension will remain in its pocket 2 after the window has been lowered sufficiently to produce an exhaust slot $x$ of about 1 inch in height, that the vehicle body will be properly ventilated when the vehicle is in motion, due to the fact that the currents of air, represented by the arrows $s$ in Figure 2 that bank against the front side of the wind shield 4 of the body and then escape laterally at the end of said wind shield, will create a suction in flowing rearwardly across the exhaust slot $x$ that is of sufficient intensity to cause foul air, gases and smoke, represented in Figure 2 by the reference character $w$, to be withdrawn from the interior of the body through the exhaust opening $x$. In traveling around the corner produced by the junction of the wind shield 4 and the side wall of the body, the air currents $s$ jump the exhaust slot $x$ on account of its close proximity to said corner, and then flow inwardly towards the side wall of the body, as indicated by the arrows in Figure 2. Such inwardly-flowing air currents, however, cannot enter the body as they strike against the element 1 of the structure, to wit, the extension on the top edge of the window that is located at the rear end of the exhaust slot $x$.

It is not essential that the element of the structure which acts as a partial closure for the space between the top edge of the window and the top member of the window frame be carried by or combined with the window. On the contrary, said element may consist of a downwardly-projecting extension or depending portion $1^a$ on the top member 3 of the window frame, constructed either of opaque or transparent material and proportioned so that when a window B' provided with a straight top edge, is lowered slightly, as shown in Figure 3, a ventilating opening $x$ will be formed at the top edge of the window extending rearwardly from the front edge of the window opening and terminating at a point near the center of the window. When the window B' is moved upwardly to close the same the element $1^a$ is automatically rendered inoperative, and when said window is lowered slightly, or moved into a partially open condition, as shown in Figure 3, the element $1^a$ will become operative automatically to perform the function for which it is designed, i. e., to reduce the length of the space between the top edge of the window and the opposed member of the window frame sufficiently to produce an exhaust opening through which gases and air can escape from the body of the vehicle without liability of air entering the body through said exhaust opening.

In the case of an automobile body having a side wall provided with front and rear doors, both doors may, if desired, be equipped with my improved ventilating device, but I have found that a ventilating means of the kind previously described, when combined with one of the front doors of an automobile body of the sedan type causes the body to be effectively ventilated without subjecting the occupant or occupants to discomforting drafts, due to the fact that the air which banks against the wind shield at the front end of the body and then flows laterally and rearwardly over the side walls of the body, produces a suction of sufficient intensity to cause foul air, gases and smoke to be withdrawn from the interior of the body without liability of air entering the body through the ventilating opening or exhaust opening. Such a result cannot be attained with an automobile body of conventional construction, for when a door window, particularly a front door window, is lowered slightly or arranged in a partially open condition, currents of air flow into the body over the top edge of the window, due to the fact that the slot at the top edge of the window is so long that some of the air which rushes rearwardly at the side of the body is bound to flow into the body through the rear end portion of said slot. My invention obviates or overcomes this objectionable characteristic of conventional vehicle bodies by providing an exhaust opening in the side wall of the body whose area and location are such that air rushing rearwardly over the side wall of the body will not enter said slot, but will produce a suction on same that causes the interior of the body to be maintained in a properly ventilated condition. This, coupled with the fact that the means I use to attain this highly desirable result does not detract from the appearance of the body of the vehicle, makes my ventilating means far superior to ventilating devices of the kind that have heretofore been used for ventilating vehicle bodies.

Having thus described my invention, what I claim as new and desire to secure by Letters Patent is:

1. In a vehicle body, the combination of a frame arranged in a side wall of the body, a vertically-adjustable window in said frame constructed so as to be capable of being moved upwardly into a fully closed position to produce an imperforate panel for said frame, and an integral means carried by one of said elements that serves as a closure for approximately the rear half portion of the space between the top member of the frame and the window when the window is moved downwardly slightly for the purpose described.

2. A closure for an opening in the side wall of a vehicle body, comprising a frame, a vertically-adjustable window in said frame, an upwardly-projecting extension on the top edge of the window located adjacent the rear edge of same and being of less length than the width of the window opening in the frame, and a pocket in the top member of said frame proportioned so as to receive and completely house said extension when the window is moved upwardly into its fully closed position so as to form an imperforate panel for said frame.

3. In a vehicle body, the combination of a window frame, a vertically-adjustable glass panel in said frame whose top edge is in contact with the top member of said frame throughout its entire length when said panel is in its fully raised position, an integral extension projecting upwardly from the rear half portion of the top edge of said panel, and a pocket in the top member of the window frame that receives and completely houses said extension when the panel is in its fully closed position.

WILLIAM D. CROWELL.